(12) United States Patent
Woo et al.

(10) Patent No.: US 10,928,029 B1
(45) Date of Patent: Feb. 23, 2021

(54) GUIDE LAMP FOR VEHICLE

(71) Applicant: SL Corporation, Daegu (KR)

(72) Inventors: Sung Min Woo, Gyeongsan-si (KR); Chang Kyung Yun, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/925,569

(22) Filed: Jul. 10, 2020

(30) Foreign Application Priority Data

Dec. 27, 2019 (KR) .......................... 10-2019-0176002

(51) Int. Cl.
| | |
|---|---|
| *F21S 43/20* | (2018.01) |
| *F21V 5/00* | (2018.01) |
| *F21W 103/20* | (2018.01) |
| *F21W 103/45* | (2018.01) |
| *F21Y 103/10* | (2016.01) |

(52) U.S. Cl.
CPC .............. *F21S 43/26* (2018.01); *F21V 5/008* (2013.01); *F21W 2103/20* (2018.01); *F21W 2103/45* (2018.01); *F21Y 2103/10* (2016.08)

(58) Field of Classification Search
CPC ............ F21Y 2115/10; F21W 2103/20; F21W 2103/45; F21W 2103/15; F21S 43/20; F21S 43/235; F21S 43/236; F21S 43/237; F21S 43/239; F21S 43/241; F21S 43/242; F21S 43/243; F21S 43/245; F21S 43/247; F21S 43/249; F21S 43/251; F21S 43/255; F21S 43/26; F21S 43/27
See application file for complete search history.

(56) References Cited

U.S. PATENT DOCUMENTS

2004/0004840 A1\* 1/2004 Machida .............. B60Q 1/2607
362/487

\* cited by examiner

*Primary Examiner* — Robert J May
(74) *Attorney, Agent, or Firm* — Nelson Mullins Riley & Scarborough LLP; Kongsik Kim, Esq.

(57) ABSTRACT

A guide lamp for a vehicle to indicate a proceeding direction of the vehicle includes a housing partitioned into a first area and a second area adjacent to each other, a substrate disposed on a rear face of the housing, and a light source unit mounted on the substrate. The light source unit includes a first light source module corresponding to the first area and including at least one light emitting element, and a second light source module corresponding to the second area and including at least one light emitting element. The guide lamp for the vehicle further includes a first lens unit disposed in front of the light source unit, and the first lens unit includes a first guide lens corresponding to the first light source module in the first area, and a first backup lens corresponding to the second light source module in the second area.

19 Claims, 17 Drawing Sheets

(a)   (b)   (c)

(a)  (b)

(c)

(a)

(b)

GUIDE LAMP FOR VEHICLE

CROSS-REFERENCE TO RELATED APPLICATION

This application claims priority from Korean Patent Application No. 10-2019-0176002 filed on Dec. 27, 2019, the contents of which in their entirety are herein incorporated by reference.

BACKGROUND

1. Technical Field

The present disclosure relates to a guide lamp for a vehicle, and more particularly, to a guide lamp for a vehicle capable of forming a plurality of guide patterns on a road surface.

2. Description of the Related Art

Generally, a vehicle is equipped with a variety of guide lamps having an illumination function to allow an object located around the vehicle to be easily identified while driving, and a signal function to notify other vehicles or other road users of the vehicle's driving status.

In general, a guide lamp provided in a vehicle includes a turn signal guide lamp and a reverse guide lamp. The turn signal guide lamp is operated by the operation of a driver's multi-function switch when driving a vehicle, and is a lamp that functions to notify other vehicles of a direction of the vehicle in changing lanes or in turning at an intersection. The reverse guide lamp is a lamp to illuminate the rear side when a driver puts a shift lever in a reverse (R) stage, and to notify the intent to backup to other vehicles around.

However, a conventional guide lamp is provided to simply irradiate light of a light source through a lens to the outside. Therefore, when a guide lamp of a preceding vehicle is disposed in a blind spot where a driver of another vehicle in the rear side is unable to see, there is a disadvantage that it is impossible to know whether the guide lamp is operating. Further, in severe cases, the intention of the preceding vehicle to change lanes or to backup may not be clearly recognized, which can lead to an accident.

In addition, the conventional guide lamp has a structure implemented in addition to the existing vehicle lamp, for example, a front lamp and a rear lamp. Therefore, there is a problem that a lamp mounting space is restricted, assembly is more difficult, and a process is complicated. In addition, although it can inform a proceeding direction of a vehicle to a driver of another vehicle or a pedestrian outside the blind spot, an ability to inform the proceeding direction of the vehicle to a driver of another vehicle or a pedestrian within the blind spot is significantly limited.

Accordingly, there is a need for a method capable of informing a proceeding direction of the vehicle to a driver of another vehicle or a pedestrian, who is at a position difficult to observe the driving of the vehicle. Further, there is a need for a method to simplify the configuration for informing the proceeding direction of the vehicle and to more generally apply the configuration to vehicles.

SUMMARY

Aspects of the present disclosure provide a lamp for a vehicle in which in order to indicate a direction of the vehicle to other drivers or pedestrians on a road. The lamp for the vehicle may generate a beam pattern that indicates the direction of the vehicle in the form of an optical beam on a road surface with a single light source, and thus it may notify the possibility of entering of a vehicle or the direction of the vehicle to the driver of another vehicle or pedestrian nearby, and may improve safety and reduce the risk of accidents.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an exemplary embodiment, a guide lamp for a vehicle to indicate a proceeding direction of the vehicle may include a housing partitioned into a first area and a second area adjacent to each other; a substrate disposed on a rear face of the housing; a light source unit mounted on the substrate, the light source unit comprising a first light source module corresponding to the first area and including at least one light emitting element, and a second light source module corresponding to the second area and including at least one light emitting element; and a first lens unit disposed in front of the light source unit, the first lens unit comprising a first guide lens corresponding to the first light source module in the first area, and a first backup lens corresponding to the second light source module in the second area.

The guide lamp for the vehicle may be installed in the vehicle with an optical axis tilted downward by about 5 to 15 degrees with respect to a horizontal line. The housing may include a partition member for partitioning the first area and the second area.

Further, the guide lamp for the vehicle may further include a second lens unit disposed on a front face of the housing. In particular, the second lens unit may include a second guide lens disposed in front of the first guide lens in the first area and a second backup lens disposed in front of the first backup lens in the second area. The guide lamp for the vehicle may further include a shield unit disposed between the first guide lens and the second guide lens in the first area, the shield unit forming a pattern displayed on a road surface and reducing glare. The shield unit may comprise a shield plate disposed between the first guide lens and the second guide lens, and a guide pattern hole provided in the shield plate to define the pattern and a size thereof formed on the road surface corresponding to the light emitting element of the first guide lens. A plurality of guide pattern holes may be formed adjacent to each other on the shield plate. The plurality of guide pattern holes may be disposed at the same height on the shield plate. The guide pattern hole may have a different spot area depending on a position of the light emitting element.

The first guide lens may adjust a position and emission range of the pattern displayed on the road surface based on an optical shape of the first guide lens. The first light source module may include a plurality of light emitting elements, positions of which may be different from each other. The plurality of light emitting elements of the first light source module may be disposed on the substrate, and the positions of the plurality of light emitting elements may become gradually higher going from an outermost side toward the second area.

The first guide lens may be disposed at a position that is coaxial with an optical axis of the light emitting element of the first light source module. A size of the first guide lens may increase from the outermost side toward the first backup lens. The first lens unit may include a lens plate that integrally forms the first guide lens and the first backup lens. In particular, the lens plate may include the first guide lens in the first area, and the lens plate may include a first guide lens area provided in a stepwise manner from the outermost side toward the second area corresponding to the light emitting element of the first light source module.

The second light source module may include a plurality of light emitting elements. In particular, the plurality of light emitting elements may be disposed adjacent to each other, and the light emitting element disposed at the outermost side among the plurality of light emitting elements may be disposed higher than other light emitting elements among the plurality of light emitting elements. At least two of the first backup lens may be formed in the same optical shape, and the first backup lens may be disposed at a position that is coaxial with an optical axis of the light emitting element of the second light source module.

The second lens unit may be mounted on the front face of the housing, and the second guide lens and the second backup lens may be disposed linearly on the same plate. Further, an exit surface of the second guide lens and an exit surface of the second backup lens may be formed in a convex shape with convex top, bottom, left, and right. An incident surface of the second guide lens may be formed as a planar incident surface. An incident surface of the second backup lens may be formed as a convex incident surface that is convex in a horizontal direction.

The guide lamp for the vehicle according to the exemplary embodiments of the present disclosure as described herein may project and display a proceeding direction of a vehicle in the form of an indication line on a road surface. Therefore, the driver of the vehicle may more easily recognize the proceeding and driving direction of the vehicle or a parking direction on the road.

In addition, the guide lamp for the vehicle according to the exemplary embodiments of the present disclosure may include a shield unit having a cut-out opening to allow light emitted toward a first lens unit from the light source unit to be maximally converged to the first lens unit. Therefore, for example, the driver may check the proceeding direction of the vehicle more clearly even in a foggy or rainy environment, and/or other drivers or road users may recognize the operating states of the vehicle more clearly. In addition, the guide lamp for the vehicle according to the exemplary embodiments of the present disclosure may improve space utilization as it is mounted together with other lamps of the vehicle, and may facilitate assembly processes.

However, the benefits of the present disclosure are not limited to the benefits described above, and other benefits not described will be clearly understood by those skilled in the art from the description of the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
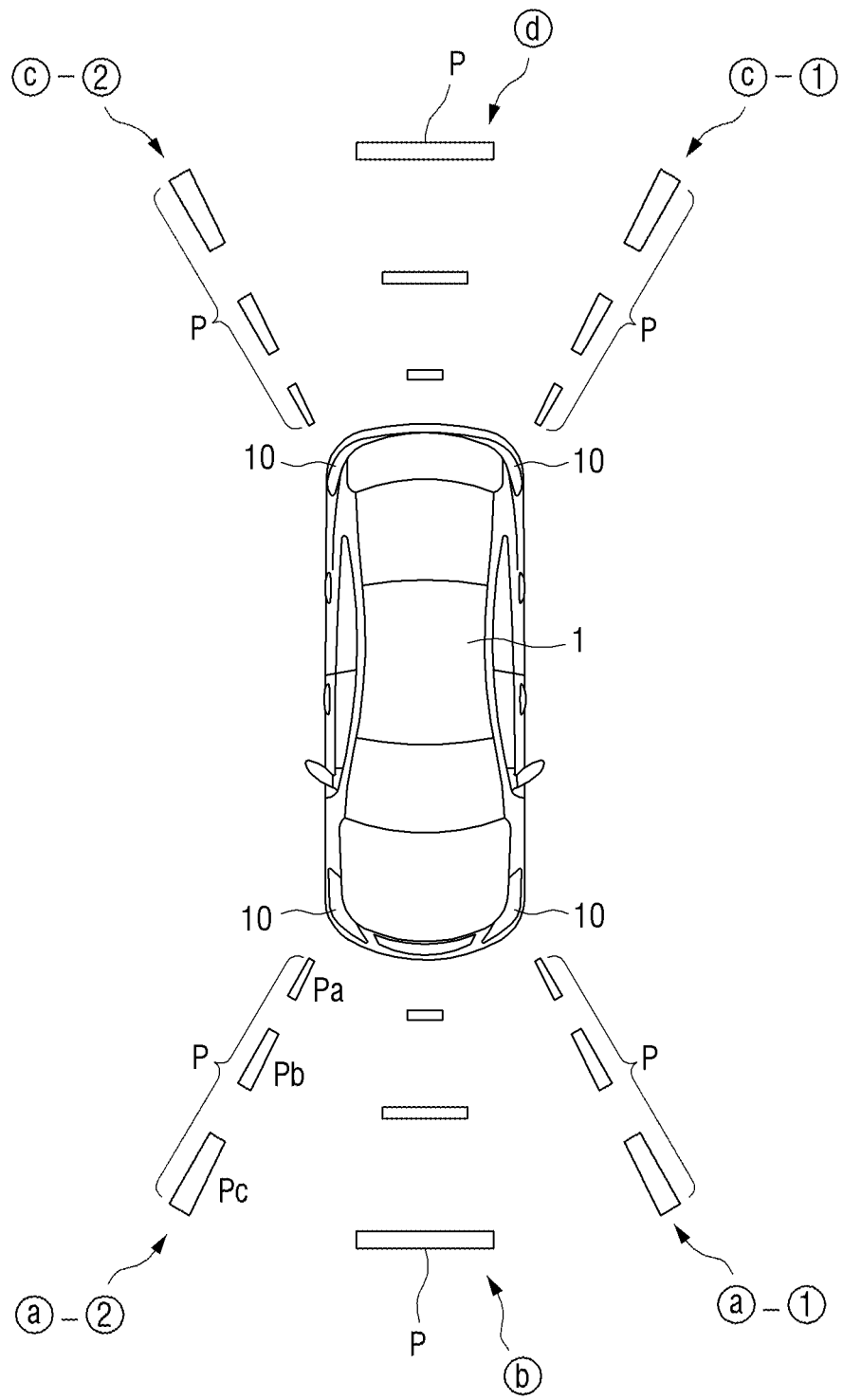
FIG. 1 is a view schematically showing a vehicle including a guide lamp for a vehicle according to an exemplary embodiment of the present disclosure.

Advantages and features of the disclosure and methods to achieve them will become apparent from the descriptions of exemplary embodiments herein below with reference to the accompanying drawings. However, the present disclosure is not limited to exemplary embodiments disclosed herein but may be implemented in various ways. The exemplary embodiments are provided for making the disclosure thorough and for fully conveying the scope of the present disclosure to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a view schematically showing a vehicle 1 including a guide lamp for a vehicle 100 according to an exemplary embodiment of the present disclosure. The guide lamp for the vehicle 100 according to the exemplary embodiment of the present disclosure may be mounted on a front or a rear surface of the vehicle 1 to display (e.g., project) an optical beam pattern on a road surface in a proceeding direction of the vehicle 1. For example, a pattern P may be formed on the road surface with the optical beam as in the form of ⓐ which is in the proceeding direction at both sides of the front of the vehicle 1. In addition, the pattern P may be formed on the road surface with the optical beam as in the form of ⓑ which is in the proceeding direction at a front center of the vehicle 1. In addition, the pattern P may be formed on the road surface with the optical beam in the proceeding direction at both sides of the rear of the vehicle 1, such as a form of ⓒ, which is different from ⓐ or ⓑ. In addition, as in the form of ⓓ, the pattern P may be formed on the road surface with the optical beam in the proceeding direction at a rear center of the vehicle 1.

The guide lamp for the vehicle 100 may inform (e.g., indicate, notify, or signal) a driver of another vehicle or a pedestrian of the proceeding direction of the vehicle 1 to be predictable. The proceeding direction of the vehicle 1 may be any one of a left turn direction, a right turn direction, and a reverse direction, and may correspond to a planned proceeding direction of the vehicle 1 to inform the driver of another vehicle 1 or the pedestrian located in a blind spot of the vehicle 1.

Furthermore, the proceeding direction of the vehicle 1 may further include one of a left direction and a right direction. Although it is less likely to form blind spots than the left turn direction and the right turn direction, informing an entry direction of the vehicle 1 by various means may help prevent traffic accidents. Therefore, any one of the left direction and the right direction may be included in the proceeding direction of the vehicle 1.

The guide lamp for the vehicle 100 of the present disclosure may be included in a configuration for indicating a left direction entry or a right direction entry of the vehicle 1 to the driver of another vehicle 1 or the pedestrian based on an existing auxiliary light flashing type (e.g., a turn signal indicator), or may be provided separately from the configuration for indicating the direction of the existing auxiliary light flashing type.

The guide lamp for the vehicles 100 may be provided for each proceeding direction of the vehicle 1. For example, as described above, the guide lamp for the vehicle 100 may be included to correspond to the left turn direction and the right turn direction during a forward movement, among the proceeding directions of the vehicle 1, such as ⓐ-1 or ⓐ-2; to a straight (e.g., forward) direction, among the proceeding directions of the vehicle 1, such as ⓑ; to the left turn direction and the right turn direction during a backward movement, among the reverse directions of the vehicle 1, such as ⓒ-1 or ⓒ-2; and to the straight backward direction, among the proceeding directions of the vehicle 1, such as ⓓ.

In particular, in ⓐ-1 or ⓐ-2 or ⓒ-1 or ⓒ-2, the guide lamp for the vehicle 100 may be formed as a configuration to indicate the proceeding direction by being disposed on the left or right side of a front or rear portion of the vehicle 1, or may be provided by being mounted adjacent to the lamp for the vehicle 10, such as a turn signal lamp, disposed on the left or right side of the front or rear portion of the vehicle 1 and as a part of a multi-component configuration. Likewise, ⓑ or ⓓ may be formed as a single configuration for indicating a forward or backward proceeding direction among the front or rear portion of the guide lamp for the vehicle 100, or may include a configuration for indicating proceeding direction disposed in the front or rear portion of the vehicle 1.

For example, when it is specified that the proceeding direction of the vehicle 1 is to be the left turn direction, the driver of another vehicle or the pedestrian may be notified that the vehicle 1 will proceed to the left turn direction by the operation of the ⓐ-1 guide lamp for the vehicle 100 corresponding to the left turn direction, which is the specified proceeding direction of the vehicle 1. As the vehicle 1 may include a plurality of vehicle guide lamps 100, the present disclosure may further include an electronic control device for selecting a guide lamp for the vehicle 100, among the plurality thereof, that corresponds to the specified proceeding direction of the vehicle 1 and operating the selected guide lamp for the vehicle 100.

Further, to indicate the proceeding direction of the vehicle 1 to other road users with a more simplified configuration, the guide lamp for the vehicle 100 according to the present disclosure may generate an indicator beam in the proceeding direction of the vehicle 1 in the form of the optical beam on the road surface as a guide beam having multiple patterns P using a single light emitting element.

Figure 2:
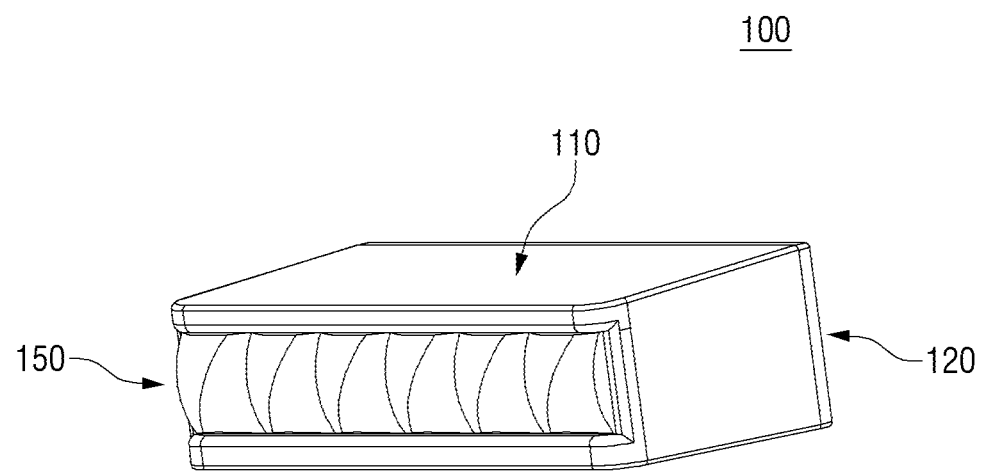
FIG. 2 is a schematic perspective view of the guide lamp for the vehicle according to the exemplary embodiment of the present disclosure.
Figure 3:
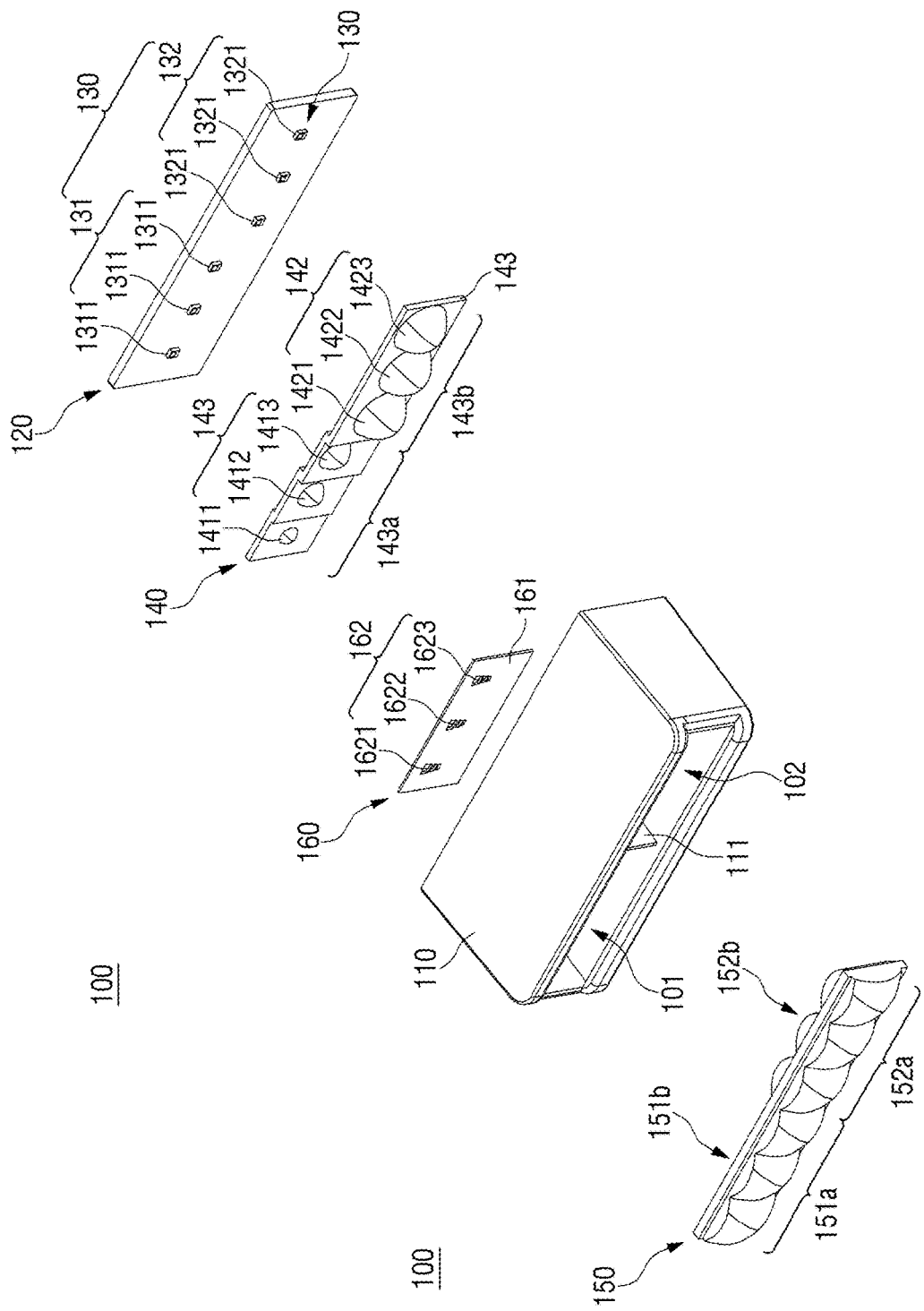
FIG. 3 is a schematic exploded perspective view of the guide lamp for the vehicle according to the exemplary embodiment of the present disclosure.
Figure 4:
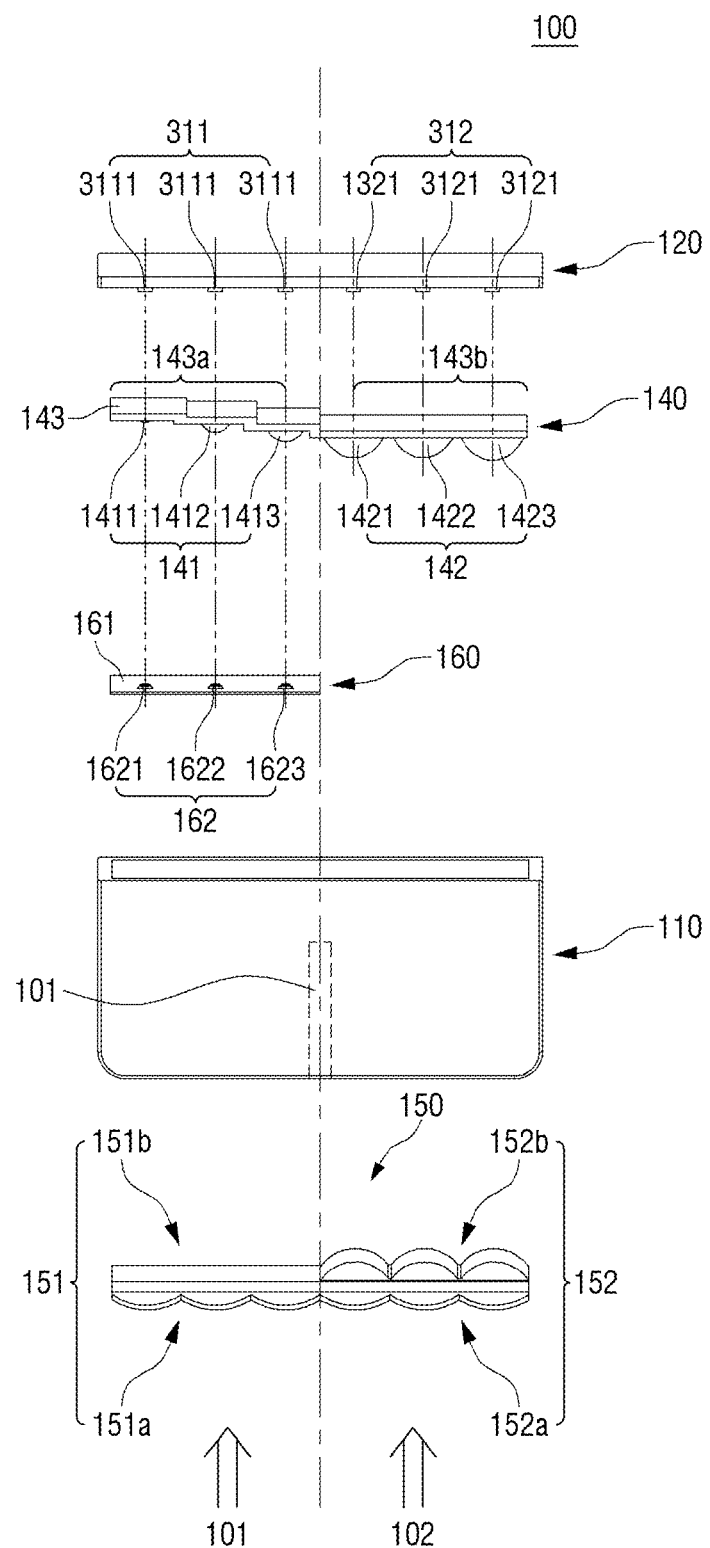
FIG. 4 is a schematic exploded plan view of the guide lamp for the vehicle according to the exemplary embodiment of the present disclosure.
Figure 5:
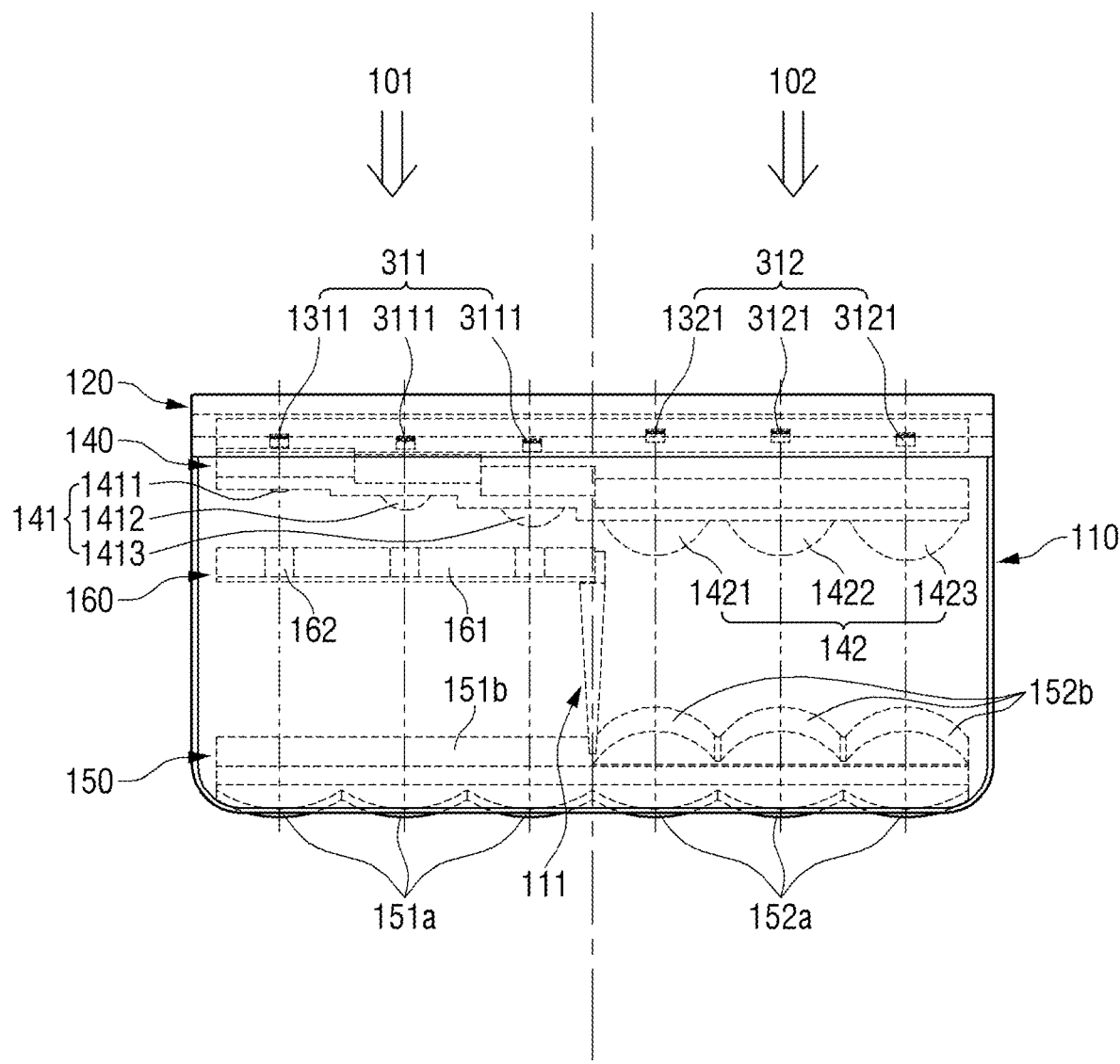
FIG. 5 is a schematic assembled plan view of the guide lamp for the vehicle according to the exemplary embodiment of the present disclosure.

Hereinafter, the guide lamp for the vehicle 100 mounted on the vehicle may be described in detail. FIG. 2 is a schematic perspective view of the guide lamp 100 for the vehicle according to the exemplary embodiment of the present disclosure. FIG. 3 is a schematic exploded perspective view of the guide lamp 100 for the vehicle according to the exemplary embodiment of the present disclosure. FIG. 4 is a schematic exploded plan view of the guide lamp 100 for the vehicle according to the exemplary embodiment of the present disclosure. FIG. 5 is a schematic assembled plan view of the guide lamp 100 for the vehicle according to the exemplary embodiment of the present disclosure.

Referring to FIGS. 2 to 5, the guide lamp for the vehicle 100 according to the exemplary embodiment of the present disclosure may be provided in a vehicle to display a proceeding direction of the vehicle in the form of a pattern on a road surface. In addition to forming the proceeding direction of the vehicle as the pattern on the road surface, the guide lamp for the vehicle 100 according to the exemplary embodiment of the present disclosure may also be configured to implement general backup lights (e.g., general lights such as front lights, rear lights, or turn signals). In addition, the guide lamp for the vehicle 100 according to the exemplary embodiment of the present disclosure may be installed at about 5 to 15 degrees downward from a horizontal line on the vehicle to implement a light distribution pattern or a guide pattern on the road surface.

The guide lamp for the vehicle 100 according to the exemplary embodiment of the present disclosure may include a housing 110, a substrate 120, a light source unit 130, a first lens unit 140, a second lens unit 150, and a shield unit 160. The housing 110 may be partitioned into a first area 101 and a second area 102 adjacent to each other. A partition member 111 that divides the first area 101 and the second area 102 may be disposed within the housing 110 in an optical axis direction. The partition member 111 may be provided from a front face of the housing 110 to a front surface of the first lens unit 140, and may be provided in the guide lamp for the vehicle 100 to partition a configuration for the light distribution for the guide and a configuration for the light distribution for the backup light.

The substrate 120 may be disposed on a rear face of the housing 110, and the light source unit 130, which will be described later, may be mounted on the front surface thereof. The light source unit 130 may be mounted on the substrate 120, and may be mounted with light emitting elements to emit light toward the first lens unit 140. The light source unit 130 may include a first light source module 131 and a second light source module 132. The first light source module 131 may correspond to the first area 101, and may include at least one light emitting element mounted on the substrate 120. The second light source module 132 may correspond to the second area 102, and may include at least one light emitting element mounted on the substrate 120. The first light source module 131 and the second light source module 132 will be described in more detail with reference to FIGS. 6 to 10 below.

The first lens unit 140 may be disposed on one surface of the light source unit 130, and may receive light from the light source unit 130 and emit the light to the second lens unit 150. The first lens unit 140 may include a first guide lens 141 and a first backup lens 142. The first guide lens 141 and the first backup lens 142 may be integrally provided. The first lens unit 140 may receive light of the light source unit 130 and refract the light to proceed straight.

The first guide lens 141 may be provided to correspond to the first light source module 131 in the first area 101. The first guide lens 141 may be a lens that implements output (e.g., emission) of the first light source module 131 to form a pattern at a particular position on the road surface and to adjust a light emission range. The first backup lens 142 may be provided adjacent to the first guide lens 141 to correspond to the second light source module 132 in the second area 102. The first backup lens 142 may receive light of the second light source module 132 and emit a light distribution pattern to the outside of the vehicle.

The second lens unit 150 may be mounted on the front face of the housing 110, and may receive light emitted from the first lens unit 140 and emit it to the outside. Further, the second lens unit 150 may receive the light emitted from the first lens unit 140 and invert it vertically and emit it. The second lens unit 150 may include a second guide lens 151 and a second backup lens 152.

The second guide lens 151 may be disposed in front of the first guide lens 141 in the first area 101. The second guide lens 151 may receive the light emitted from the first guide lens 141 and irradiate (e.g., project) to a particular position on the road surface. The second backup lens 152 may be disposed in front of the first backup lens 142 in the second area 102. The second backup lens 152 may receive the light emitted from the first backup lens 142 and form a light distribution pattern outside the vehicle to be irradiated.

The shield unit 160 may be disposed between the first guide lens 141 and the second guide lens 151 in the first area 101. The shield unit 160 may form a design pattern on the road surface and determine a size thereof, and may obstruct light from emitting except for the pattern. In other words, the light output from the first lens unit 140 may be obstructed from being emitted at portions other than the pattern shape due to the shield unit 160. Therefore, light may be transmitted through an open portion based on the pattern shape and may reach the second lens unit 150.

A detailed configuration of the first lens unit 140, the second lens unit 150, and the shield unit 160 may be specifically described with reference to FIGS. 6 to 15.

Figure 6:
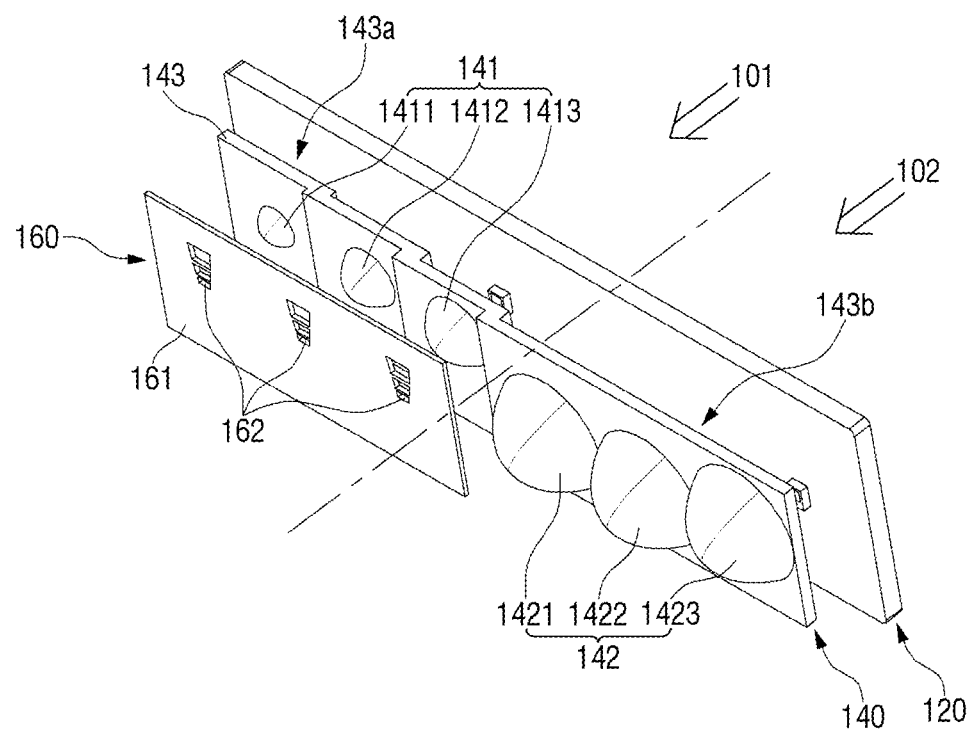
FIG. 6 is a schematic perspective view showing a stacked state of a substrate, a light source unit, a first lens unit, and a shield unit in the guide lamp for the vehicle according to the exemplary embodiment of the present disclosure.
Figure 7:
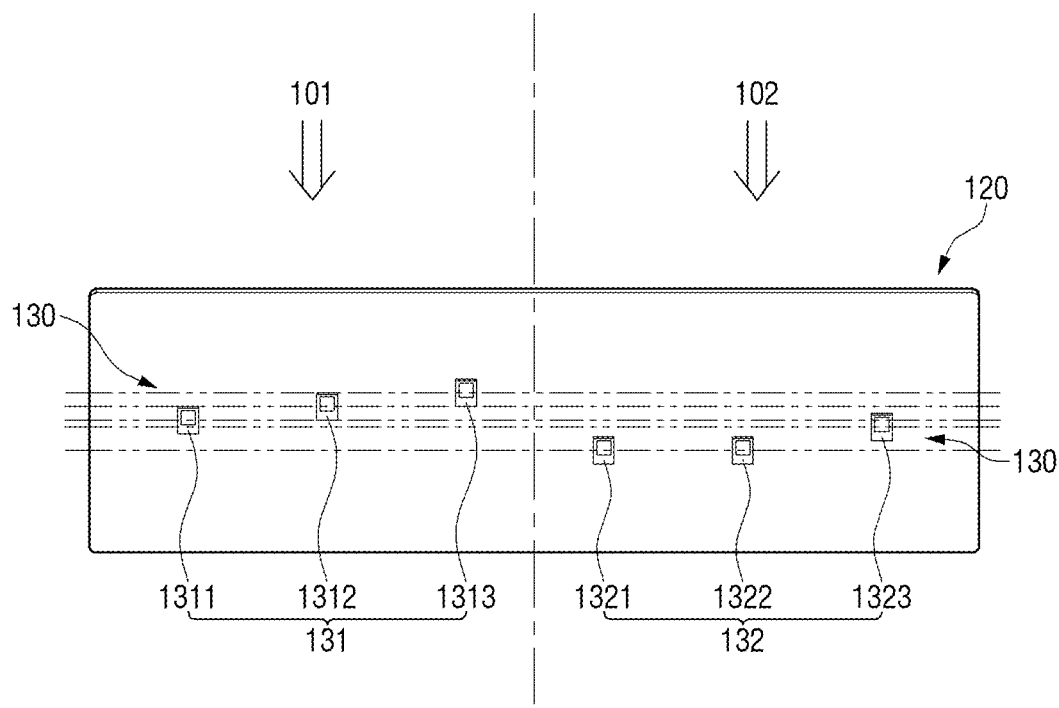
FIG. 7 is a front view schematically showing a substrate and a light source unit in the guide lamp for the vehicle according to the exemplary embodiment of the present disclosure.
Figure 8:
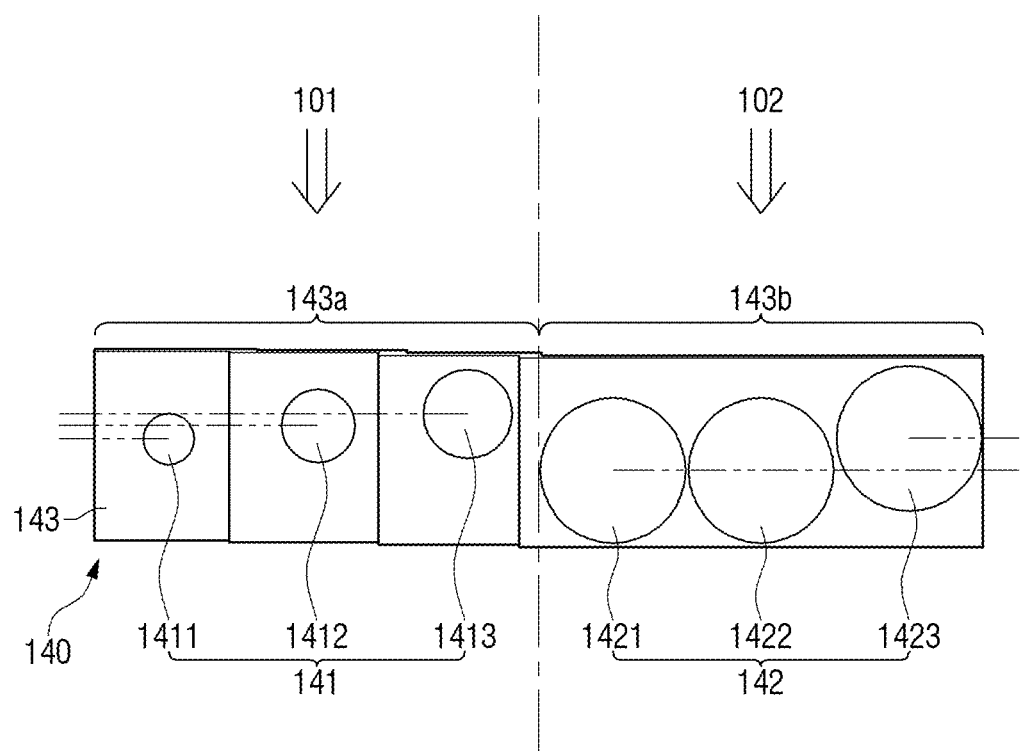
FIG. 8 is a schematic plan view of the first lens unit in the guide lamp for the vehicle according to the exemplary embodiment of the present disclosure.
Figure 9:
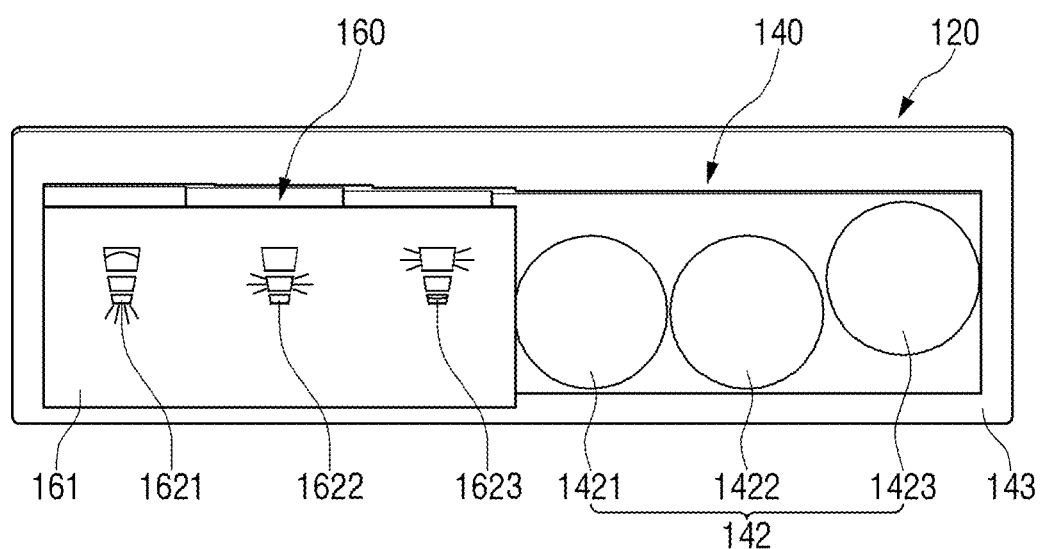
FIG. 9 is a schematic front view showing the stacked state of the substrate, the light source unit, the first lens unit, and the shield unit in the guide lamp for the vehicle according to the exemplary embodiment of the present disclosure.

FIG. 6 is a schematic perspective view showing a stacked state of the substrate 120, the light source unit 130, the first lens unit 140, and the shield unit 160 in the guide lamp for the vehicle 100 according to the exemplary embodiment of the present disclosure. FIG. 7 is a front view schematically showing the substrate 120 and the light source unit 130 in the guide lamp for the vehicle 100 according to the exemplary embodiment of the present disclosure. FIG. 8 is a schematic plan view of the first lens unit 140 in the guide lamp for the vehicle 100 according to the exemplary embodiment of the present disclosure. FIG. 9 is a schematic front view showing a stacked state of the substrate 120, the light source unit 130, the first lens unit 140, and the shield unit 160 in the guide lamp for the vehicle 100 according to the exemplary embodiment of the present disclosure.

Referring to FIGS. 6 to 9, the light source unit 130 according to the exemplary embodiment of the present disclosure may be arranged linearly in a direction perpendicular to the optical axis direction on the substrate 120, and may be partitioned into the first light source module 131 in the first area 101 and the second light source module 132 in the second area 102. In addition, the first light source module 131 may be disposed above the second light source module 132. Herein, the terms "above" or "higher" or equivalents thereof may be defined based on the orientation shown in FIGS. 7 and 8, and should not be construed in the sense of absolute positions.

First, the first light source module 131 may include a plurality of light emitting elements, and may be mounted on the substrate 120 being arranged upwardly toward the second area 102 from the outermost side. For example, the first light source module 131 in the exemplary embodiment of the present disclosure may include three light emitting elements, specifically, a first light emitting element 1311, a second light emitting element 1312, and a third light emitting element 1313. The light emitting element provided at one side of the first area 101, for example, the leftmost position in the drawing, may correspond to the first light emitting element 1311, and the second light emitting element 1312 and the third light emitting element 1313 may be arranged in order from the first light emitting element 1311.

Going from the first light emitting element 1311 toward the third light emitting element 1313, the light emitting elements may be upwardly positioned on the substrate 120. In other words, the second light emitting element 1312 adjacent to the first light emitting element 1311 may be disposed above the first light emitting element 1311 by a predetermined interval while being spaced apart to the right from the first light emitting element 1311. In addition, the third light emitting element 1313 adjacent to the second light emitting element 1312 may be disposed above the second light emitting element 1312 by a predetermined interval while being spaced apart to the right from the second light emitting element 1312. In an exemplary embodiment of the present disclosure, the first light source module 131 may include three light emitting elements. However, the present disclosure is not limited thereto, and the number of the light emitting elements in the first light source module 131 may be changed or modified depending on the pattern or position to be formed on the road surface.

The second light source module 132 may include a plurality of light emitting elements. The light emitting elements of the second light source module 132 may be disposed adjacent to each other, in which the light emitting element disposed at the outermost side of the light emitting elements may be positioned above the rest of the light emitting elements. For example, the second light source module 132 according to the exemplary embodiment of the present disclosure may include three light emitting elements, specifically, in order, a fourth light emitting element 1321, a fifth light emitting element 1322, and a sixth light emitting element 1323, to the right of the first light source module 131.

The fourth light emitting element 1321 and the fifth light emitting element 1322 may be spaced apart from each other, and may be disposed at the same height. The sixth light emitting element 1323 provided on the outermost side may be disposed at a higher position than the fourth light emitting element 1321 and the fifth light emitting element 1322. The sixth light emitting element 1323 may be disposed above the other light emitting elements to match an area irradiated during backup light distribution. In the second light source module 132, the number of light emitting elements, the positions thereof, and the like may be changed or modified.

As described above, the first lens unit 140 according to the exemplary embodiment of the present disclosure, may include a lens plate 143 having a lens (first guide lens 141 and the first backup lens 142 described above) disposed in front of the front surface of the substrate 120 on which the light source unit 130 is mounted. The first guide lens 141 and the first backup lens 142 may be integrally formed on the lens plate 143, and may be arranged linearly adjacent to each other in a direction perpendicular to the optical axis direction. The lens plate 143 may include a first guide lens area 143*a* having the first guide lens 141 corresponding to the first area 101, and a first backup lens area 143*b* having the first backup lens 142 corresponding to the second area 102.

The lens plate 143 of the first guide lens area 143*a* may be provided in a stepwise manner from the outermost side toward the second area 102 to correspond to the light emitting elements of the first light source module 131. For example, a first portion of the lens plate 143 on which a first lens 1411 is formed, a second portion of the lens plate 143 on which a second lens 1412 is formed, and a third portion of the lens plate 143 on which a third lens 1413 is formed may be provided stepwise with respect to each other and with steps formed therebetween. Accordingly, the second portion may protrude farther toward the front side compared to the first portion, and the third portion may protrude farther toward the front side compared to the second portion. In addition, the first backup lens area 143*b* adjacent to the third portion may be stepped from the third portion. Therefore, the lens plate 143 of the first backup lens area 143*b* may protrude farther toward the front side compared to the third portion. As will be described below, sizes of the lenses formed in the first guide lens area 143*a*, that is, the first lens 1411, the second lens 1412, and the third lens 1413 may be formed in different sizes while the first light source module 131 may be formed on the same plane. Accordingly, the first light source module 131 may have a focal length in accordance with a focus according to an optical shape of the lenses. To this end, the lens plate 143 of the first guide lens area 143*a* may be formed in the stepped manner.

As described above, the first backup lens area 143*b* may include the first backup lens 142 corresponding to the second area 102, in which the first backup lens area 143*b* is provided in a stepwise manner at an end of the first guide lens area 143*a*, specifically at the third portion. The first backup lens area 143*b* may include the first backup lens 142 corresponding to the light emitting element of the second light source module 132 while being formed on the same plane.

Each of the first backup lenses 142 may be formed in the same optical shape on the same plane of the lens plate 143. The first backup lens 142 may be disposed at a position coaxial with an optical axis of the light emitting element of the second light source module 132. As described above, since the light emitting element provided at the outermost side of the second light source module 132 may be disposed above the other light emitting elements on the substrate 120, a first backup lens disposed at the outermost side of the first backup lenses may be disposed at a higher position than the other first backup lenses and may have an optical axis disposed higher than optical axes of the other first backup lenses. For example, the first backup lens 142 may include a fourth lens 1421, a fifth lens 1422, and a sixth lens 1423 to correspond to the fourth light emitting element 1321, the fifth light emitting element 1322, and the sixth light emitting element 1323, respectively. In particular, the fourth lens 1421, the fifth lens 1422, and the sixth lens 1423 may be formed with the same optical properties on the same plane, in which the fourth lens 1421 and the fifth lens 1422 may be formed at the same height, and the sixth lens 1423 may be disposed above the fourth lens 1421 and the fifth lens 1422. Herein, the optic or the optical property may include an effective diameter, a thickness, a curvature, a refractive index, a focal length, or the like of the optical element.

As described above, the first lens unit 140 may be disposed in front of the light source unit 130, in which the first guide lens 141 may be disposed in front of the first light source module 131 of the first area 101, and the first backup lens 142 may be disposed in front of the second light source module 132 of the second area 102.

The first guide lens 141 may be configured to adjust a position and emission range of the pattern displayed on the road surface based on the optical properties. Specifically, the first guide lens 141 may adjust the position or emission range of the pattern displayed on the road surface by varying the optical properties for each corresponding light emitting element. In addition, the first guide lens 141 may be disposed at a position coaxial with the optical axis of the light emitting element of the first light source module 131. In addition, a size may increase from the outermost side toward the first backup lens 142. For example, the first guide lens 141 may include a first lens 1411, a second lens 1412, and a third lens 1413 to correspond to light emitting elements of the first light source module 131, specifically, the first light emitting element 1311, the second light emitting element 1312, and the third light emitting element 1313, respectively.

As described above, the size of the optic may be formed to increase from the first lens 1411 to the third lens 1413. In addition, as the positions of the light emitting elements become higher going from the first light emitting element 1311 to the third light emitting element 1313 in the substrate 120, and as each first guide lens 141 is positioned coaxially with each light emitting element, the positions of the first guide lens 141 may become higher going from the first lens 1411 to the third lens 1413. In other words, the second lens 1412 may be adjacent to the first lens 1411 and be upwardly disposed with respect to the first lens 1411, and the third lens 1413 may be adjacent to the second lens 1412 and be upwardly disposed with respect to the second lens 1412.

As described above, the step of the lens plate 143 in the first guide lens area 143a and the size of the optic of the first guide lens 141 may be changed or modified depending on a pattern to be implemented on the road surface.

Figure 10:
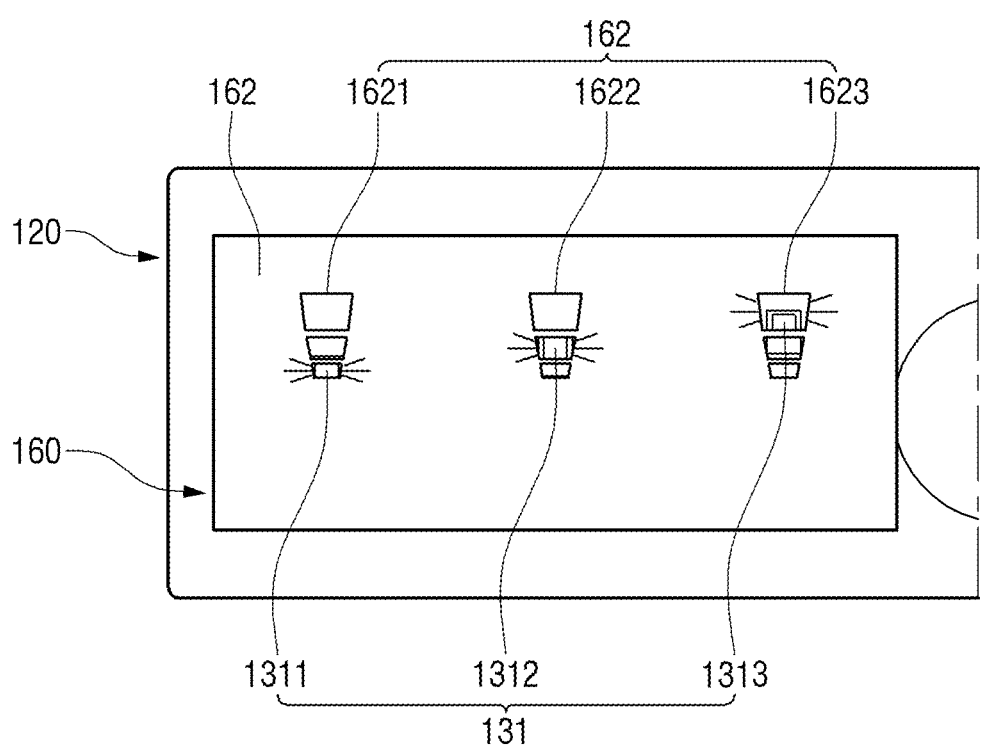
FIG. 10 is an enlarged front view of the substrate, the light source unit, the first lens unit, and the shield unit of a first area in the guide lamp for the vehicle according to the exemplary embodiment of the present disclosure.
Figure 11:
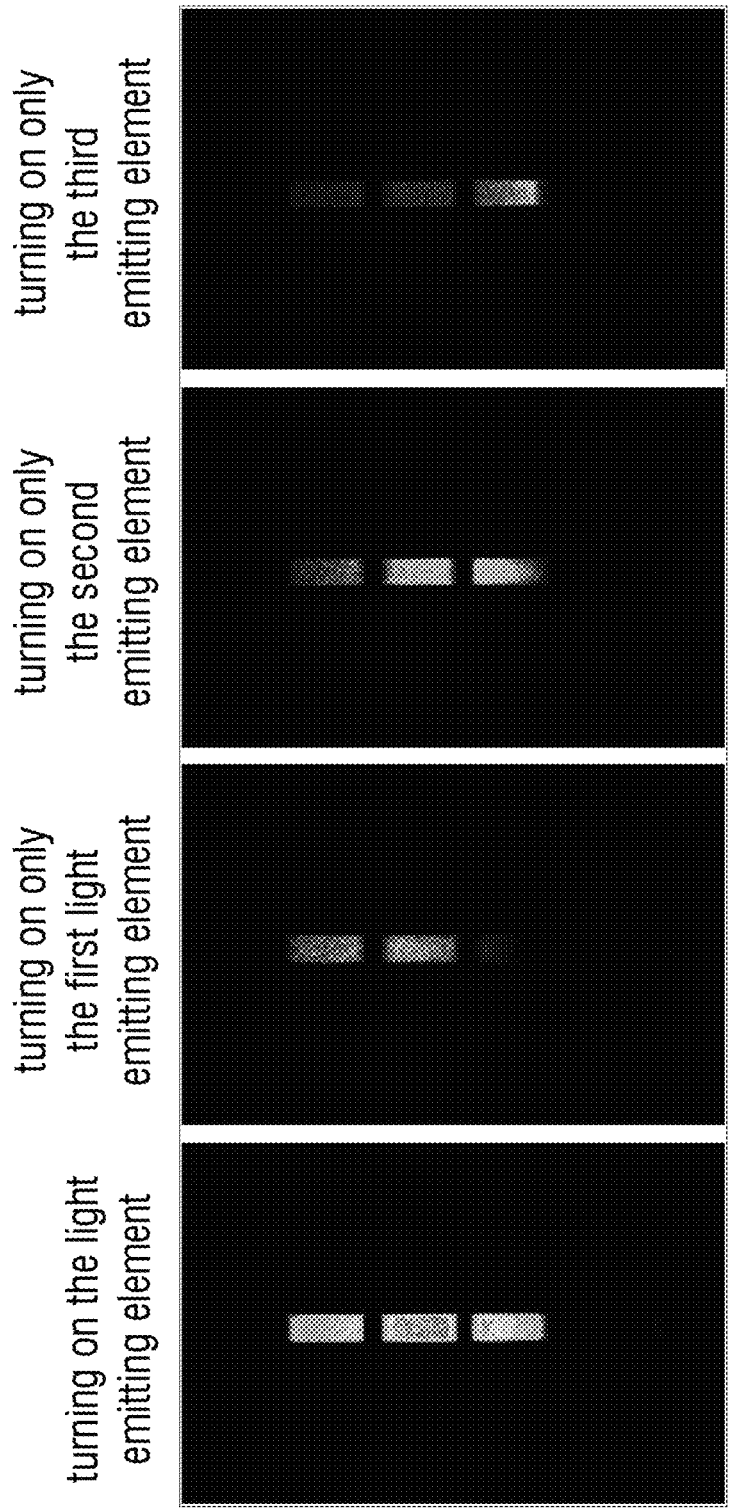
FIG. 11 is a view schematically showing a pattern formed on a road surface by the guide lamp for the vehicle according to the exemplary embodiment of the present disclosure.
Figure 12:
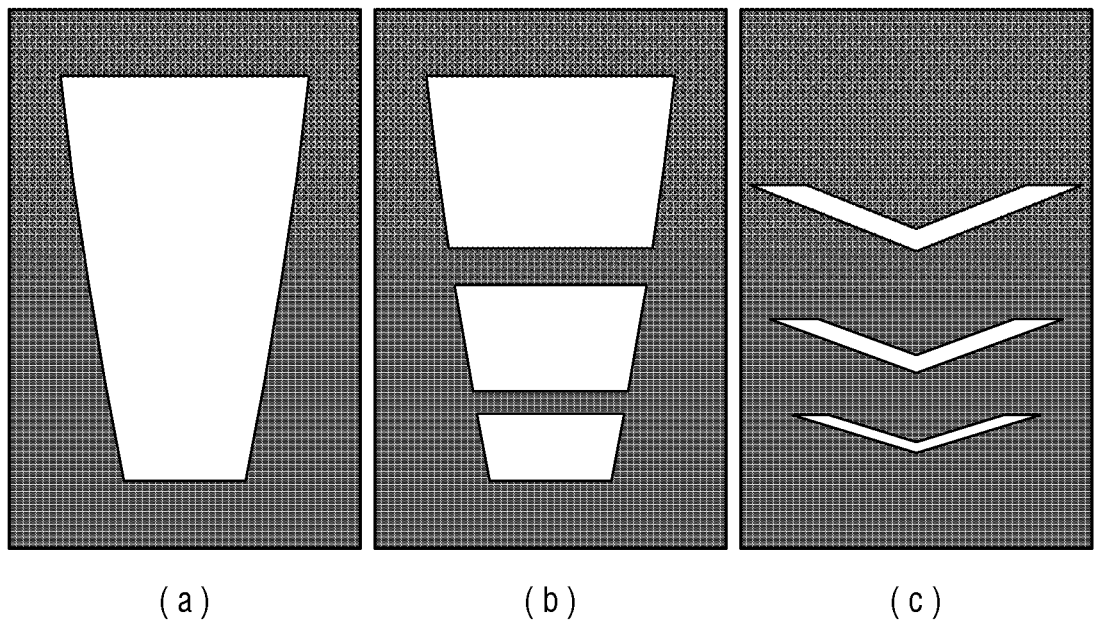
FIG. 12 is a view schematically showing a shape of a guide pattern hole of the shield unit in the guide lamp for the vehicle according to the exemplary embodiment of the present disclosure.
Figure 13:
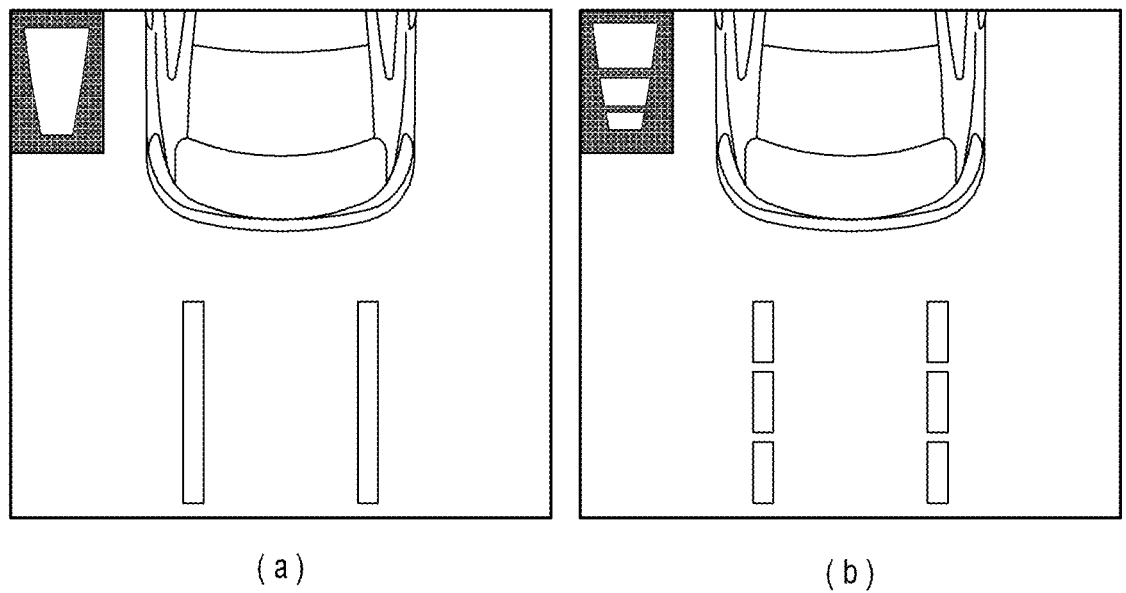
FIG. 13 is a view showing a pattern formed on the road surface along the guide pattern hole of the shield unit in the guide lamp for the vehicle according to the exemplary embodiment of the present disclosure.
Figure 13:
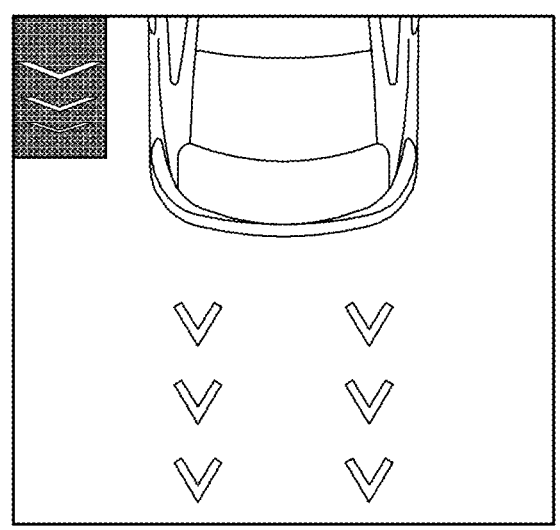

FIG. 10 is an enlarged front view for the substrate 120, the light source unit 130, the first lens unit 140, and the shield unit 160 in the first area 101 in the guide lamp for the vehicle 100 according to the exemplary embodiment of the present disclosure. FIG. 11 is a view schematically showing the pattern formed on the road surface by the guide lamp for the vehicle 100 according to the exemplary embodiment of the present disclosure. FIG. 12 is a view schematically showing shapes of a guide pattern hole 162 of the shield unit 160 in the guide lamp for the vehicle 100 according to the exemplary embodiment of the present disclosure. FIG. 13 is a view showing a pattern formed on the road surface according to the guide pattern hole 162 of the shield unit 160 in the guide lamp for the vehicle 100 according to the exemplary embodiment of the present disclosure.

Referring to FIGS. 10 to 13, the shield unit 160 according to the exemplary embodiment of the present disclosure may be disposed between the first guide lens 141 and the second guide lens 151 in the first area 101, and may form the pattern displayed on the road surface while limiting or reducing glare. The shield unit 160 may include a shield plate 161 and the guide pattern hole 162.

The shield plate 161 may be disposed between the first guide lens 141 and the second guide lens 151. The shield plate 161 may be configured to obstruct light emitted from the first guide lens 141 from being emitted except at a predetermined position (the guide pattern hole 162 to be described later). The guide pattern hole 162 may be provided on the shield plate 161. The guide pattern hole 162 may correspond to the pattern and size to be formed on the road surface while corresponding to the light emitting element of the first guide lens 141.

The guide pattern hole 162 may be provided to correspond to the first light source module 131, specifically, the light emitting elements of the first light source module 131, respectively. For example, as three light emitting elements of the first light source module 131, i.e., the first light emitting element 1311, the second light emitting element 1312, and the third light emitting element 1313 may be provided, three guide pattern holes 162 may also be included, namely, a first guide pattern hole 1621, a second guide pattern hole 1622 and a third guide pattern hole 1623 in the shield unit 160.

In addition, the first guide pattern hole 1621, the second guide pattern hole 1622, and the third guide pattern hole 1623 may be formed adjacent to each other at the same vertical position in the shield plate 161. In addition, a length from an upper side to a lower side of the guide pattern hole 162 may correspond to a position of the light emitting element in the first light source module 131. In addition, the guide pattern hole 162 may have a different spot area depending on the position of the light emitting element.

For example, the first light emitting element 1311 and the first lens 1411 may be disposed at the lowermost portion of the first guide pattern hole 1621. For instance, light output from the first light emitting element 1311 may have the greatest intensity at a position corresponding to the lowermost portion of the first guide pattern hole 1621, and the lowermost portion of the first guide pattern hole 1621 may be disposed at the spot area of light. Further, the second light emitting element 1312 and the second lens 1412 may be disposed at a central portion between an upper and lower sides of the second guide pattern hole 1622. Accordingly, light output from the second light emitting element 1312 may have the greatest intensity at a position corresponding to the central portion of the second guide pattern hole 1622, and the central portion of the second guide pattern hole 1622 may be disposed at the spot area of light. Similarly, the third light emitting element 1313 and the third lens 1413 may be disposed at the uppermost portion of the third guide pattern hole 1623. Therefore, light output from the third light emitting element 1313 may have the greatest intensity at the uppermost portion of the third guide pattern hole 1623, and the uppermost portion of the third guide pattern hole 1623 may be disposed at the spot area of light.

The guide pattern hole 162 according to the exemplary embodiment of the present disclosure may be formed in various shapes depending on the shape of the pattern to be formed on the road surface. For example, as shown in panel (a) of FIG. 12, the guide pattern hole 162 may be formed with an inverted ladder-shaped opening. Accordingly, a guide pattern as shown in panel (a) of FIG. 13 may be formed on the road surface. In addition, as shown in panel (b) of FIG. 12, the guide pattern hole 162 may be formed of a plurality of openings that become gradually smaller in the form of an inverted ladder. Accordingly, a guide pattern as shown in panel (b) of FIG. 13 may be formed on the road surface. Further, as shown in panel (c) of FIG. 12, the guide pattern hole 162 may be formed of a plurality of openings that become gradually smaller in the form of a boomerang (e.g., a letter "V"). Accordingly, a guide pattern as shown in panel (c) of FIG. 13 may be formed on the road surface.

Figure 14:
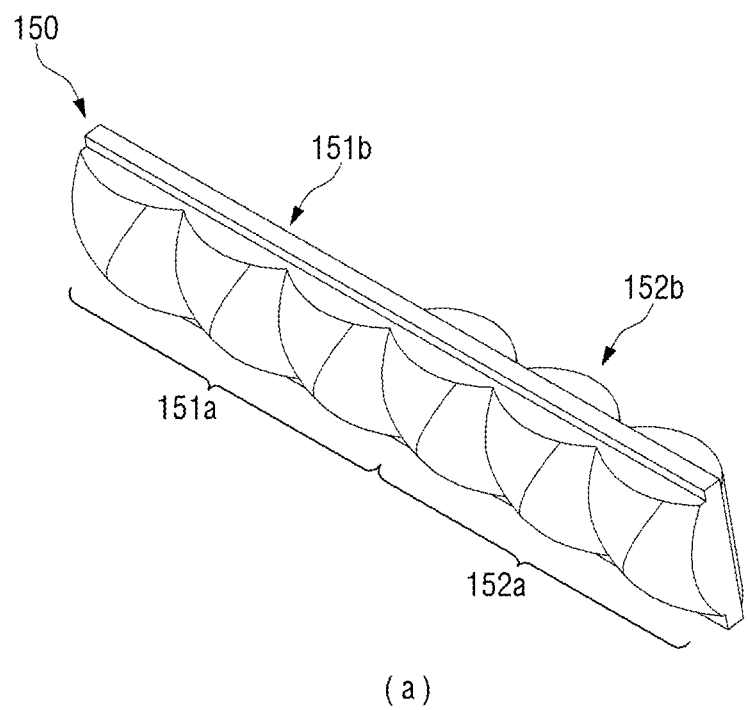
FIG. 14 is a schematic view of a second lens unit in the guide lamp for the vehicle according to the exemplary embodiment of the present disclosure.
Figure 14:
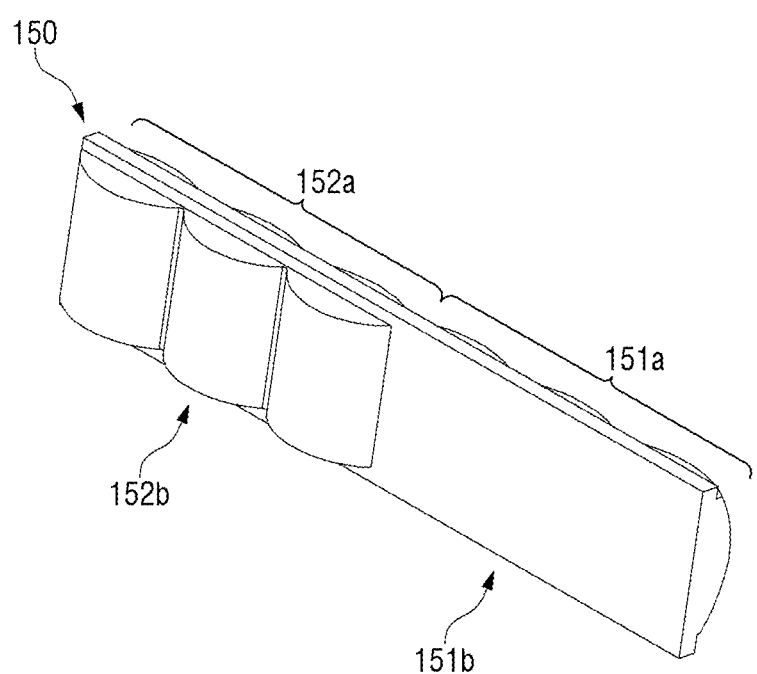

FIG. 14 is a schematic diagram of the second lens unit 150 in the guide lamp for the vehicle 100 according to the exemplary embodiment of the present disclosure. Referring to FIG. 14 and preceding FIGS. 2 to 5 together, the second lens unit 150 according to the exemplary embodiment of the present disclosure may have a structure spaced apart from the front surface of the first lens unit 140 and mounted on the front face of the housing 110 as described above. In addition, the second lens unit 150 may include the second guide lens 151 and the second backup lens 152, in which the second guide lens 151 and the second backup lens 152 may be integrally disposed adjacent to each other and linearly on the same plate.

The second guide lens 151 may be disposed in the first area 101 of the second lens unit 150, and may be disposed in front of the shield unit 160 which is disposed in front of the first guide lens 141. The second backup lens 152 may be disposed in the second area 102 of the second lens unit 150, and may be disposed in front of the first backup lens 142. Accordingly, the first area 101 may have a structure in which the first light source module 131, the first guide lens 141, the shield unit 160, and the second guide lens 151 are arranged in order, and the second area 102 may have a structure in which the second light source module 132, the first backup lens 142, and the second backup lens 152 are arranged in order.

The second lens unit 150 may include exit surfaces 151a and 152a and incident surfaces 151b and 152b. Specifically, the first area 101 may include the incident surface 151b and the exit surface 151a, and the second area 102 may include the incident surface 152b and the exit surface 152a. In the present disclosure, the exit surfaces 151a and 152a of the second lens unit 150 may include a convex exit surface with convex top, bottom, left, and right. In other words, the exit surface 151a of the second guide lens 151 of the first area 101 and the exit surface 152a of the second backup lens 152 of the second area 102 may be formed in the same convex shape with convex top, bottom, left, and right.

Conversely, in the present disclosure, the incident surfaces 151b and 152b of the second lens unit 150 may be implemented in different forms in the second guide lens 151 and the second backup lens 152. Specifically, the incidence surface 151b of the second guide lens 151 may be formed as a planar incidence surface to allow the light that passes through the shield unit 160 to be vertically inverted and irradiated to the road surface. On the other hand, the incident surface 152b of the second backup lens 152 may be formed as a convex incident surface that is convex in a longitudinal direction (e.g., horizontal direction) to diffuse light and provide sufficient light distribution.

Figure 15:
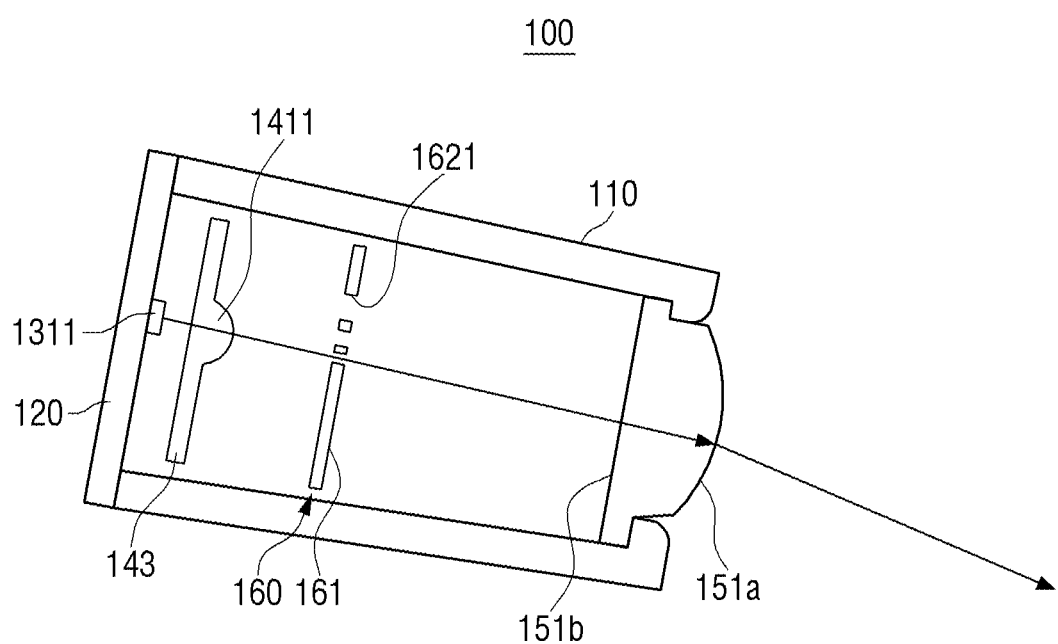
FIG. 15 is a cross-sectional view of a position of a first light emitting element in the guide lamp for the vehicle according to the exemplary embodiment of the present disclosure.
Figure 16:
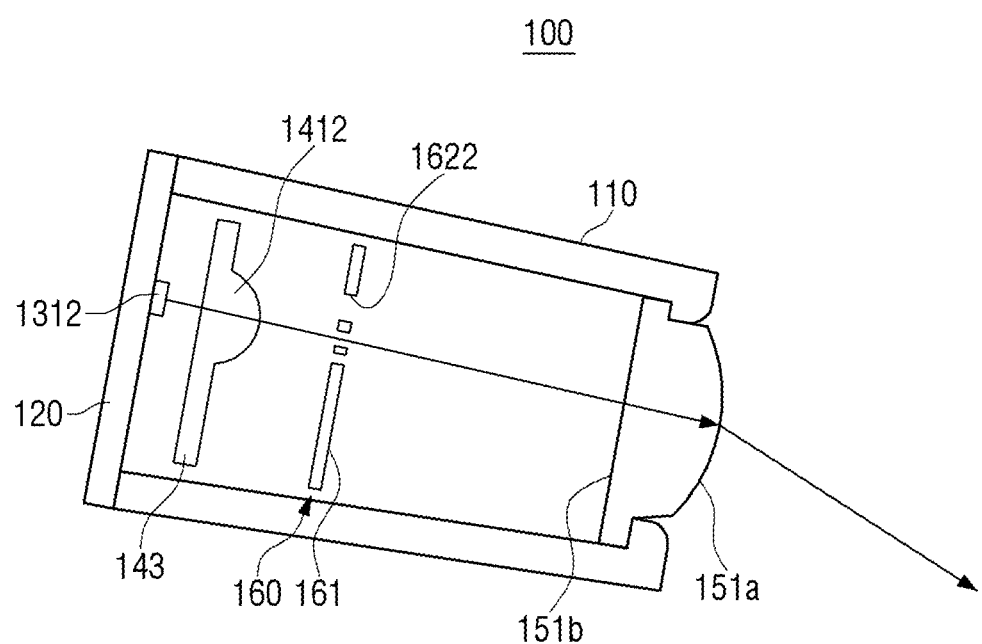
FIG. 16 is a cross-sectional view of a position of a second light emitting element in the guide lamp for the vehicle according to the exemplary embodiment of the present disclosure.
Figure 17:
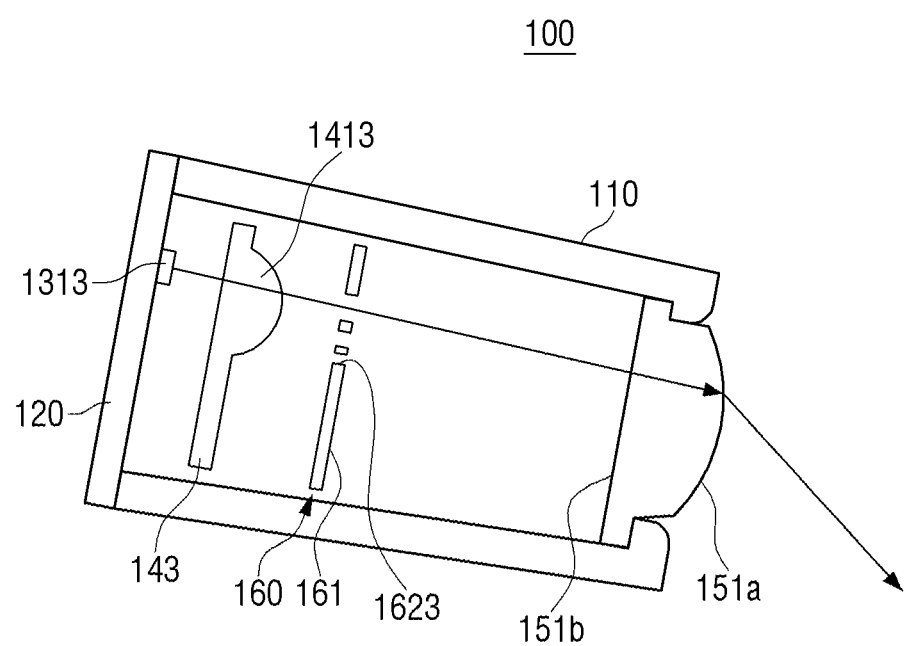
FIG. 17 is a cross-sectional view of a position of a third light emitting element in the guide lamp for the vehicle according to the exemplary embodiment of the present disclosure.

FIG. 15 is a cross-sectional view along a position of the first light emitting element 1311 in the guide lamp for the vehicle 100 according to the exemplary embodiment of the present disclosure. FIG. 16 is a cross-sectional view along a position of the second light emitting element 1312 in the guide lamp for the vehicle 100 according to the exemplary embodiment of the present disclosure. FIG. 17 is a cross-sectional view along a position of the third light emitting element 1313 in the guide lamp for the vehicle 100 according to the exemplary embodiment of the present disclosure.

As described above, referring to FIGS. 15 to 17, the substrate 120, the light source unit 130, the first lens unit 140, the shield unit 160, and the second lens unit 150 may be coupled to the housing 110. These components may be partitioned into the first area 101 and the second area 102 via the partition member 111. Accordingly, the guide lamp for the vehicle 100 may be divided into a portion (first area 101) that forms a guide pattern on the road surface and an area that implements light distribution of the vehicle (second area 102), and thus, two functions may be provided with one structure. As described above, the first area 101 may have a structure in which the first light source module 131, the first guide lens 141, the shield unit 160, and the second guide lens 151 are arranged in order, and the second area 102 may have a structure in which the second light source module 132, the first backup lens 142, and the second backup lens 152 are arranged in order.

In addition, the guide lamp for the vehicle 100 may be capable of emitting light toward the road surface as it is mounted to the vehicle 1 by being tilted downward by about 5 to 15 degrees, for example by about 10 degrees. Accordingly, in the guide lamp for the vehicle 100, the second area 102 may function as a backup lamp of the vehicle, while the first area 101 may function as a guide lamp.

Specifically, considering the light emission by the first light emitting element 1311 in the first area 101, as shown in FIG. 14, the light of the first light emitting element 1311 of the first light source module 131 may be emitted to the first lens 1411 that has the smallest optic and is disposed at the lower side of the substrate 120, which forms a coaxial arrangement with the first light emitting element 1311. The first lens 1411 may receive the light output from the first light emitting element 1311, allow it to be introduced into the shield unit 160, specifically, the lowermost portion of the first guide pattern hole 1621, and allow it to be emitted from the convex exit surface through a planar incident surface of the second guide lens 151. The light output through the first light emitting element 1311 to the second guide lens 151 may implement the brightest pattern on the road surface that is formed closest to the vehicle (see the second panel of FIG. 11).

In addition, considering the light emission by the second light emitting element 1312 in the first area 101, as shown in FIG. 15, the light of the second light emitting element 1312 of the first light source module 131 may be emitted to the second lens 1412 that has an optic larger than the first lens 1411 and smaller than the third lens 1413 and is disposed at a middle position of the substrate 120, which forms a coaxial arrangement with the second light emitting element 1312. The second lens 1412 may receive the light output from the second light emitting element 1312, allow it to be introduced into the shield unit 160, specifically, the central portion of the second guide pattern hole 1622, and allow it to be emitted from the convex emission surface through the planar incident surface of the second guide lens 151. The light output to the second guide lens 151 through the second light emitting element 1312 may implement the brightest pattern on the road surface farther away from the vehicle than a position where the light from the first light emitting element 1311 is formed on the road surface (see the third panel of FIG. 11).

Furthermore, considering the light emission by the third light emitting element 1313 in the first area 101, as shown in FIG. 16, the light of the third light emitting element 1313 of the first light source module 131 may be emitted to the third lens 1413 that has the largest optic among the lenses of the first guide lens 141 and is disposed at an upper position of the substrate 120, which forms a coaxial arrangement with the third light emitting element 1313. The third lens 1413 may receive the light output from the third light emitting element 1313, allow it to be introduced into the shield unit 160, specifically, the uppermost portion of the third guide pattern hole 1623, and allow it to be emitted from the convex emission surface through the planar incident surface of the second guide lens 151. The light output to the third lens 1413 through the third light emitting element 1313 may implement the brightest pattern on the road surface farther away from the vehicle than the position where the light from the second light emitting element 1312 is formed on the road surface and at a position farthest from the vehicle (see the fourth panel of FIG. 11).

Accordingly, the resulting pattern may be collectively formed on the road surface by the superimposed light output from the first light emitting element 1311, the second light emitting element 1312, and the third light emitting element 1313 (see the first panel of FIG. 11).

Many modifications and other embodiments of the disclosure will come to the mind of one skilled in the art having the benefit of the teachings presented in the foregoing descriptions and the associated drawings. Therefore, it is understood that the disclosure is not to be limited to the specific exemplary embodiments disclosed, and that modifications and embodiments are intended to be included within the scope of the appended claims.

What is claimed is:

1. A guide lamp for a vehicle to indicate a proceeding direction of the vehicle, comprising:

a housing partitioned into a first area and a second area adjacent to each other;

a substrate disposed on a rear face of the housing;

a light source unit mounted on the substrate, wherein the light source unit comprises a first light source module corresponding to the first area and including at least one light emitting element, and a second light source module corresponding to the second area and including at least one light emitting element; and a first lens unit disposed in front of the light source unit, wherein the first lens unit comprises a first guide lens corresponding to the first light source module in the first area, and a first backup lens corresponding to the second light source module in the second area.

2. The guide lamp for the vehicle of claim 1, wherein the guide lamp for the vehicle is installed in the vehicle with an optical axis tilted downward by about 5 to 15 degrees with respect to a horizontal line.

3. The guide lamp for the vehicle of claim 1, wherein the housing comprises a partition member for partitioning the first area and the second area.

4. The guide lamp for the vehicle of claim 1, further comprising:

a second lens unit disposed on a front face of the housing, wherein the second lens unit comprises:

a second guide lens disposed in front of the first guide lens in the first area; and a second backup lens disposed in front of the first backup lens in the second area.

5. The guide lamp for the vehicle of claim 4, further comprising:

a shield unit disposed between the first guide lens and the second guide lens in the first area, wherein the shield unit forms a pattern displayed on a road surface and reduces glare.

6. The guide lamp for the vehicle of claim 5, wherein the shield unit comprises:

a shield plate disposed between the first guide lens and the second guide lens; and a guide pattern hole provided in the shield plate to define the pattern and a size thereof formed on the road surface corresponding to the light emitting element of the first guide lens.

7. The guide lamp for the vehicle of claim 6, wherein a plurality of guide pattern holes are formed adjacent to each other on the shield plate.

8. The guide lamp for the vehicle of claim 6, wherein the guide pattern hole has a different spot area depending on a position of the light emitting element.

9. The guide lamp for the vehicle of claim 1, wherein the first guide lens adjusts a position and emission range of a pattern displayed on a road surface based on an optical shape thereof.

10. The guide lamp for the vehicle of claim 9, wherein the first light source module includes a plurality of light emitting elements, positions of which are different from each other.

11. The guide lamp for the vehicle of claim 10, wherein the plurality of light emitting elements of the first light source module are disposed on the substrate, and the positions of the plurality of light emitting elements become gradually higher going from an outermost side toward the second area.

12. The guide lamp for the vehicle of claim 10, wherein the first guide lens is disposed at a position that is coaxial with an optical axis of the light emitting element of the first light source module.

13. The guide lamp for the vehicle of claim 9, wherein a size of the first guide lens increases from an outermost side toward the first backup lens.

14. The guide lamp for the vehicle of claim 13, wherein the first lens unit includes a lens plate that integrally forms the first guide lens and the first backup lens, and wherein the lens plate includes the first guide lens in the first area, and the lens plate includes a first guide lens area provided in a stepwise manner from the outermost side toward the second area corresponding to the light emitting element of the first light source module.

15. The guide lamp for the vehicle of claim 1, wherein the second light source module comprises a plurality of light emitting elements, and wherein the plurality of light emitting elements are disposed adjacent to each other, and a light emitting element disposed at an outermost side among the plurality of light emitting elements is disposed higher than other light emitting elements among the plurality of light emitting elements.

16. The guide lamp for the vehicle of claim 15, wherein at least two of the first backup lens are formed in a same optical shape, and wherein the first backup lens is disposed at a position that is coaxial with an optical axis of the light emitting element of the second light source module.

17. The guide lamp for the vehicle of claim 4, wherein the second lens unit is mounted on the front face of the housing, and the second guide lens and the second backup lens are disposed linearly on a same plate, and wherein an exit surface of the second guide lens and an exit surface of the second backup lens is formed in a convex shape with convex top, bottom, left, and right.

18. The guide lamp for the vehicle of claim 17, wherein an incident surface of the second guide lens is formed as a planar incident surface.

19. The guide lamp for the vehicle of claim 17, wherein an incident surface of the second backup lens is formed as a convex incident surface that is convex in a horizontal direction.

* * * * *